United States Patent
Oh et al.

(10) Patent No.: US 9,868,376 B2
(45) Date of Patent: Jan. 16, 2018

(54) CUP HOLDER FOR VEHICLE

(71) Applicant: Hyundai Motor Company, Seoul (KR)

(72) Inventors: Man Ju Oh, Yongin-si (KR); Jae Woong Kim, Hwaseong-si (KR); Jae Woo Park, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 683 days.

(21) Appl. No.: 14/298,666

(22) Filed: Jun. 6, 2014

(65) Prior Publication Data

US 2015/0165954 A1   Jun. 18, 2015

(30) Foreign Application Priority Data

Dec. 18, 2013 (KR) .................. 10-2013-0157905

(51) Int. Cl.
| | |
|---|---|
| *F25B 21/02* | (2006.01) |
| *B60N 3/10* | (2006.01) |
| *B60Q 3/20* | (2017.01) |
| *B60Q 3/80* | (2017.01) |

(52) U.S. Cl.
CPC ............ *B60N 3/104* (2013.01); *B60N 3/106* (2013.01); *B60Q 3/20* (2017.02); *B60Q 3/80* (2017.02)

(58) Field of Classification Search
CPC ................................. B60N 3/106; B60Q 3/20
USPC ........................................................... 62/3.3
See application file for complete search history.

(56) References Cited

U.S. PATENT DOCUMENTS

| | | | | |
|---|---|---|---|---|
| 6,206,260 B1 * | 3/2001 | Covell | ................... | B60N 3/083 206/5 |
| 6,637,709 B1 * | 10/2003 | Guenther | ............. | B60N 2/4686 224/282 |
| 7,217,956 B2 * | 5/2007 | Daniels | ..................... | F21K 9/00 257/88 |
| 8,196,648 B2 * | 6/2012 | Matsukawa | ............ | B60N 3/104 165/202 |
| 8,876,352 B2 * | 11/2014 | Robbins | .................... | F21K 9/00 362/488 |

(Continued)

FOREIGN PATENT DOCUMENTS

| | | | |
|---|---|---|---|
| JP | 2000142202 A | * | 5/2000 |
| JP | 2012-99417 A | | 5/2012 |

(Continued)

OTHER PUBLICATIONS

Machine Translation of JP 2000-142202, eSpacenet, May 2000, description.*

*Primary Examiner* — Frantz Jules
*Assistant Examiner* — Filip Zec
(74) *Attorney, Agent, or Firm* — Morgan, Lewis & Bockius LLP

(57) ABSTRACT

A cup holder for a vehicle may include a holder body for storing a cup and having a thermoelectric element to thereby cool and heat the cup stored therein, a supporting part having a front end protruded to an inner side surface of the holder body and a rear end supported by an elastic part to thereby support a side surface of the cup when the cup is stored and having a light source capable of expressing a plurality of colors to thereby irradiate light toward the cup, a temperature sensor provided on the holder body to thereby measure a temperature thereof, and a controlling part changing a color of the light source of the supporting part in response to the measured temperature.

6 Claims, 2 Drawing Sheets

(56) References Cited

U.S. PATENT DOCUMENTS

| 9,068,708 B2* | 6/2015 | Antilla | B60N 3/101 |
| 2007/0204629 A1* | 9/2007 | Lofy | B60N 3/104 |
| | | | 62/3.61 |
| 2011/0199182 A1* | 8/2011 | Catlin | B60N 3/106 |
| | | | 340/5.7 |

FOREIGN PATENT DOCUMENTS

| KR | 10-2005-0100507 A | 10/2005 |
| KR | 20-2009-0006497 U | 7/2009 |
| KR | 10-2012-0118930 A | 10/2012 |
| KR | 10-2012-0130764 A | 12/2012 |
| KR | 10-1421929 B1 | 7/2014 |

* cited by examiner

CUP HOLDER FOR VEHICLE

CROSS REFERENCE TO RELATED APPLICATION

The present application claims priority of Korean Patent Application Number 10-2013-0157905 filed on Dec. 18, 2013, the entire contents of which application are incorporated herein for all purposes by this reference.

BACKGROUND OF INVENTION

Field of Invention

The present invention relates to a cup holder for a vehicle capable of allowing a user to recognize a temperature of the cup holder at the outside, thoroughly preventing accidents or injuries due to user's inattention, such as a burn, or the like, and efficiently managing an energy usage for cooling and heating the cup holder.

Description of Related Art

In installing a cooling and heating cup holder in a vehicle, the cup holder may be installed in a compact space by using a thermoelectric element according to the related art. However, an accident such as a burn due to a user's inattention, or the like may be caused by the use of the thermoelectric element and it is not easily distinguished whether the cup holder is in a cooled state or a heated state.

Therefore, in order to solve these problems, it was required to allow a user to recognize the state of the cup holder by using a color of light and prevent the accident such as the burn, or the like. In addition, it was also required to increase aesthetic beauty by implementing the above-mentioned need using a specific design of only the cup holder rather than a simply switch lamp.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is directed to provide a cup holder for a vehicle capable of allowing a user to recognize a temperature of the cup holder at the outside, thoroughly preventing accidents or injuries due to user's inattention, such as a burn, or the like, and efficiently managing an energy usage for cooling and heating the cup holder.

According to various aspects of the present invention, there is provided a cup holder for a vehicle. The cup holder may include a holder body for storing a cup and having a thermoelectric element to thereby cool and heat the cup stored therein, a supporting part having a front end protruded to an inner side surface of the holder body and a rear end supported by an elastic part to thereby support a side surface of the cup when the cup is stored and having a light source capable of expressing a plurality of colors to thereby irradiate light toward the cup, a temperature sensor provided on the holder body to thereby measure a temperature thereof, and a controlling part changing a color of the light source of the supporting part in response to the measured temperature.

The holder body may have a side surface having an opening formed therein and the front end of the supporting part may penetrate through the opening and protrude to the inner side surface of the holder body.

The supporting part may be provided with two light sources capable of expressing blue and red colors, and the controlling part may independently adjust an intensity of each light source. The controlling part may control the supporting part to gradually irradiate light in the blue color as the temperature of the holder body becomes low and control the supporting part to gradually irradiate light in the red color as the temperature of the holder body becomes high. The supporting part may be provided with a contact sensor sensing whether the cup is stored in the holder body, and the controlling part may operate the thermoelectric element only when the cup is stored in the holder body.

The cup holder may further include a switch receiving a cup holder cooling or heating request from a user. The controlling part may operate the thermoelectric element and the light source of the supporting part when the switch receives the request from the user. The supporting part may be provided with a contact sensor sensing whether the cup is stored in the holder body, and the controlling part may operate the thermoelectric element and the light source of the supporting part only when the cup is stored in the holder body and the switch receives the request from the user.

The cup holder may further include an inlet part including a circular lens wrapping around an inlet frame of the holder body and a light source capable of expressing a plurality of colors through the circular lens, wherein the controlling part may change the colors of both the light source of the supporting part and the light source of the inlet part in response to the measured temperature.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
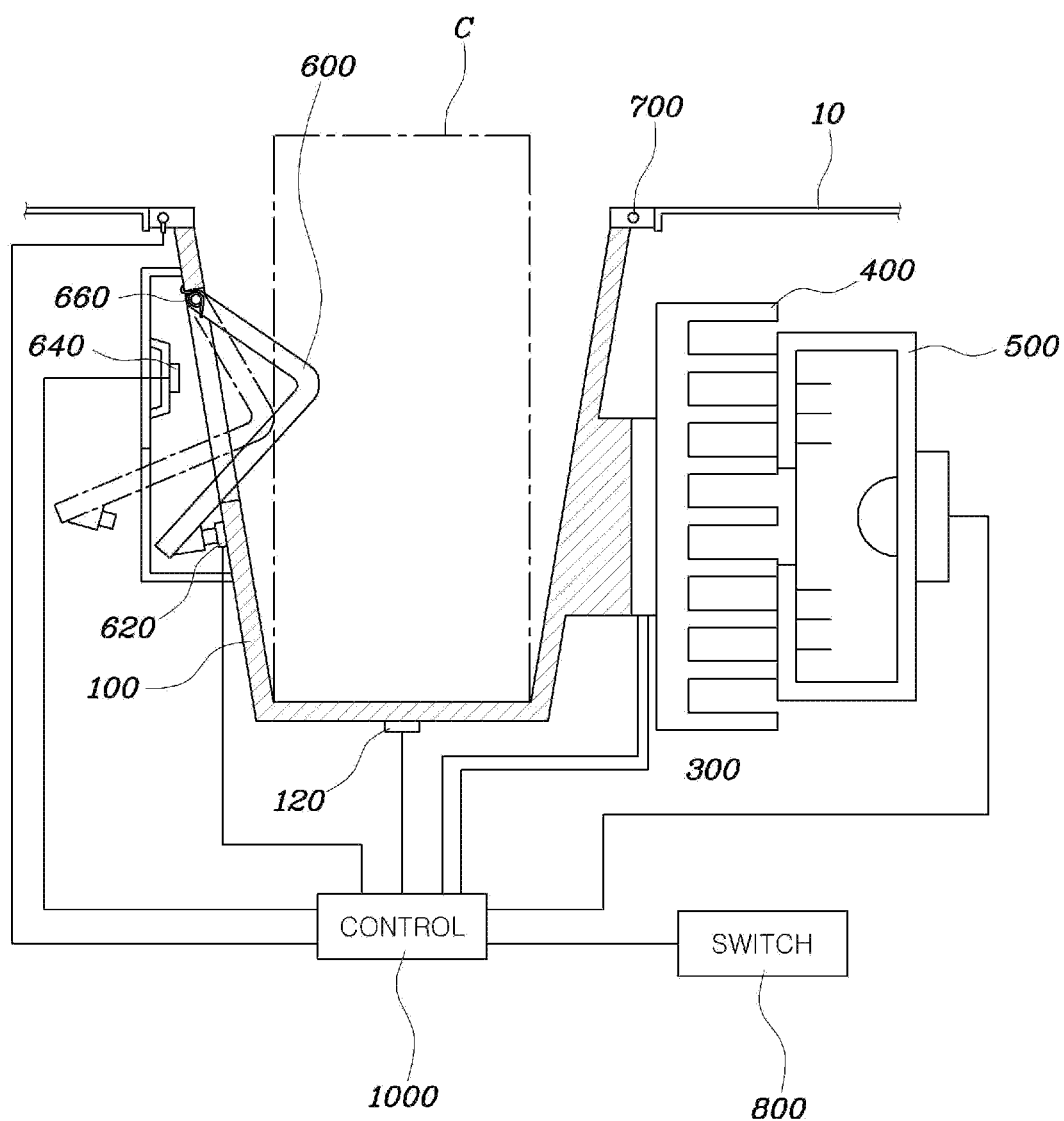
FIG. 1 is a cross-sectional view of an exemplary cup holder for a vehicle according to the present invention.
Figure 2:
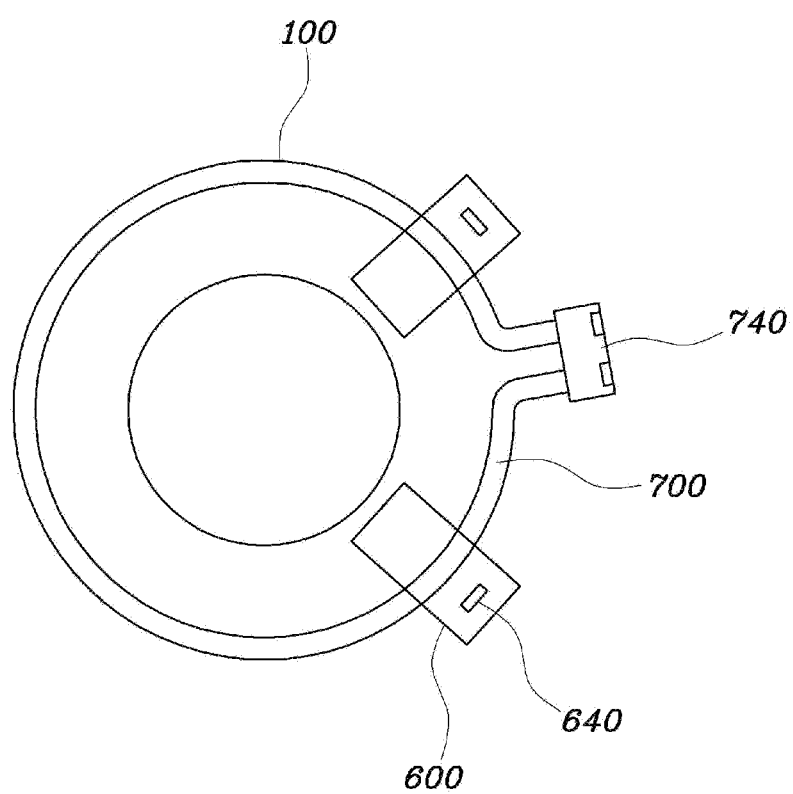
FIG. 2 is a top view of an exemplary cup holder for the vehicle according to the present invention.

FIG. 1 is a cross-sectional view of a cup holder for a vehicle and FIG. 2 is a top view of the cup holder for the vehicle according to various embodiments of the present invention. A cup holder for a vehicle according to various embodiments of the present invention may include a holder body 100 for receiving a cup C, or having a cup C stored therein and having a thermoelectric element 300 to thereby cool and heat the cup C stored therein; a supporting part 600 having a front end protruded to an inner side surface of the holder body 100 and a rear end supported by an elastic part 660 to thereby support a side surface of the cup C when the cup C is stored and having a light source 640 capable of expressing a plurality of colors, e.g., emitting light in different colors, to thereby irradiate light toward the cup; a temperature sensor 120 provided on the holder body 100 to thereby measure a temperature thereof; and a controlling part 1000 changing a color of the light source of the supporting part 600 in response to a measured value of the temperature sensor 120.

The cup holder according to various embodiments of the present invention may be cooled or heated, and include a thermoelectric element 300 to perform the cooling and heating functions. As an example, in the embodiment of the present invention of FIG. 1, the holder body 100 is made of a metal material and the thermoelectric element 300 is attached to the holder body 100, such that the cooling and heating functions of the cup holder are implemented by conduction. However, the configuration of the present invention is not necessarily limited to the above exemplary embodiment, and may be utilized in various aspects such as a case using convection, and the like. The other side surface of the thermoelectric element 300 is provided with a heat radiating fin 400 for heat radiation and a blower 500.

The holder body 100 has the cup stored therein and is provided with the thermoelectric element 300 to thereby cool or heat the cup C stored therein.

In addition, the above mentioned holder body 100 is provided with a supporting part 600 having a front end protruded to an inner side surface of the holder body 100 and a rear end supported by an elastic part 660 to thereby support a side surface of the cup when the cup C is stored. Particularly, the supporting part 600 is provided with a light source 640 capable to expressing a plurality of colors to thereby irradiate light toward the cup C.

In some embodiments of the present invention, the supporting part 600 may be provided with two light sources such as blue and red as shown in FIG. 2, and the controlling part 1000 may independently adjust an intensity of each light source. In addition, the supporting part 600 is made of a transparent material, includes a bent portion protruded to the cup, and adjusts an irradiation angle of the light source to irradiate a side surface or a lower portion of the cup C, such that dazzle of a user may be prevented.

Meanwhile, the temperature sensor 120 is provided on the holder body 100 to thereby measure a temperature and the controlling part 1000 changes a color of the light source of the supporting part 600 in response to a measured value of the temperature sensor 120.

Specifically, the holder body 100 may have a side surface having an opening formed therein and the supporting part 600 may have the front end penetrating through the opening to thereby be protruded to the inner side surface of the holder body 100. Therefore, the supporting part 600 supports the cup C and irradiates light to the side surface of the cup C, such that light is naturally and softly spread along a space between the stored cup C and the holder body 100. This may provide aesthetic beauty to the user and prevent the user from being dazzled.

In addition, the controlling part 1000 controls the supporting part 600 to gradually irradiate a blue color as the temperature of the holder body 100 becomes cold or low and controls the supporting part 600 to gradually irradiate a red color as the temperature of the holder body 100 becomes hot or high. By the configuration as described above, the user may intuitively know a current temperature state of the cup holder and may pay attention particularly when the cup holder is hot, such that problems such as a burn, and the like may be prevented.

In addition, the supporting part 600 is provided with a contact sensor 620 sensing the cup when the cup is stored, wherein the controlling part 1000 may operate the thermoelectric element 300 only in the case in which the contact sensor 620 senses the storage of the cup C. That is, only in the case in which the contact sensor 620, such as that configured as shown in FIG. 1, senses a situation in which the cup C is stored and the storage of the cup C is sensed by the contact sensor 620, the thermoelectric element 300 is operated to thereby prevent unnecessary energy consumption and prevent any accident such as the burn, or the like.

Meanwhile, the cup holder for the vehicle according to various embodiments of the present invention may further include a switch 800 receiving a cup holder cooling or heating request from the user. In addition, the controlling part 1000 may operate the thermoelectric element 300 and the light source of the supporting part 600 only in the case in which the switch 800 receives the request from the user.

Particularly, the supporting part 600 is provided with the contact sensor 620 sensing the storage of the cup C when the cup C is stored, wherein the controlling part 1000 may operate the thermoelectric element 300 and the light source of the supporting part 600 only in the case in which the contact sensor 620 senses the storage of the cup C even though the switch 800 receives the request from the user. Therefore, only in the case in which the contact sensor 620 senses the storage of the cup C and the switch 800 receives the request form the user, the thermoelectric element 300 and the light source of the supporting part 600 are operated, such that the dazzle due to the irradiation of the light source in the case in which the cup C is not present in the cup holder may be prevented, and only in the case in which the contact sensor 620 senses the storage of the cup, the thermoelectric element 300 is operated, such that unnecessary energy consumption may be prevented and the safety accident such as the burn, or the like may be prevented.

Particularly, the cup holder according to the exemplary embodiment of the present invention may further include an inlet part 700 including a lens such as a circular lens wrapping around an inlet frame of the holder body 100 and a light source 740 capable of expressing a plurality of colors through the circular lens, and the controlling part 1000 may change the colors of both the light source of the supporting part 600 and the light source of the inlet part 700 in response to the measured value of the temperature sensor 120.

By the configuration as described above, the user may more surely know the temperature of holder body 100 and the inlet part 700 may also be interworked with the supporting part 600, such that the dazzle due to the irradiation of the light source in the case in which the cup is not present in the cup holder may be prevented, and only in the case in which the contact sensor 620 senses the storage of the cup, the thermoelectric element 300 is operated, such that unnecessary energy consumption may be prevented and the safety accident such as the burn, or the like may be prevented.

According to various embodiments of the present invention, the cup holder for the vehicle may allow the user to recognize the temperature thereof at the outside, thoroughly block the user's inattention such as the burn, or the like, and efficiently manage the energy usage for cooling and heating the cup holder.

For convenience in explanation and accurate definition in the appended claims, the terms "front" or "rear", "inside" or "outside," and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cup holder for a vehicle, the cup holder comprising:
    a holder body for storing a cup and having a thermoelectric element to cool or heat the cup stored therein;
    a supporting part having a front end protruded to an inner side surface of the holder body and a rear end supported by an elastic part to thereby support a side surface of the cup when the cup is stored and having a light source capable of expressing a plurality of colors to thereby irradiate light toward the cup;
    a temperature sensor provided on the holder body to thereby measure a temperature thereof; and
    a controlling part changing a color of the light source of the supporting part in response to the measured temperature,
    wherein an outer surface of the holder body is provided with a contact sensor sensing whether the cup is stored in the holder body, and the contact sensor is in contact or lose contact with a lower end of the supporting part rotated around the elastic part by the cup which is stored in the holder body or away from the holder body, and
    wherein the controlling part operates the thermoelectric element only when the cup is determined by the controlling part to be stored in the holder body through the contact sensor, wherein the supporting part is provided with two light sources capable of expressing blue and red colors, and the controlling part independently adjusts an intensity of each light source, wherein the controlling part controls the supporting part to gradually irradiate light in the blue color as the temperature of the holder body becomes low and controls the supporting part to gradually irradiate light in the red color as the temperature of the holder body becomes high.

2. The cup holder of claim 1, wherein the holder body has a side surface having an opening formed therein and the front end of the supporting part penetrates through the opening and protrudes to the inner side surface of the holder body.

3. The cup holder of claim 1, further comprising a switch receiving a cup holder cooling or heating request from a user.

4. The cup holder of claim 3, wherein the controlling part operates the thermoelectric element and the light source of the supporting part only when the switch receives the request from the user.

5. The cup holder of claim 3, wherein the controlling part operates the thermoelectric element and the light source of the supporting part only when the cup is stored in the holder body and the switch receives the request from the user.

6. The cup holder of claim 1, further comprising an inlet part including a circular lens wrapping around an inlet frame of the holder body and a light source capable of expressing a plurality of colors through the circular lens,
    wherein the controlling part changes the colors of both the light source of the supporting part and the light source of the inlet part in response to the measured temperature.

* * * * *